United States Patent
Naylor et al.

(10) Patent No.: US 9,279,442 B2
(45) Date of Patent: Mar. 8, 2016

(54) ELASTOMERIC CAP FOR SEAMLESSLY CONCEALING FASTENER USED TO SECURE OBJECT TO SUBSTRATE

(71) Applicant: DISNEY ENTERPRISES, INC., Burbank, CA (US)

(72) Inventors: Mark A. Naylor, Minneola, FL (US); Laurel L. Skaggs, Orlando, FL (US); Charles D. Stricker, Jr., Windermere, FL (US)

(73) Assignee: DISNEY ENTERPRISE, INC., Burbank, CA (US)

( * ) Notice: Subject to any disclaimer, the term of this patent is extended or adjusted under 35 U.S.C. 154(b) by 142 days.

(21) Appl. No.: 13/928,816

(22) Filed: Jun. 27, 2013

(65) Prior Publication Data
US 2015/0003932 A1   Jan. 1, 2015

(51) Int. Cl.
   *F16B 37/14*   (2006.01)
(52) U.S. Cl.
   CPC ........... *F16B 37/14* (2013.01); *Y10T 29/49948* (2015.01); *Y10T 29/49963* (2015.01)
(58) Field of Classification Search
   CPC ....................................................... F16B 37/14
   USPC ............................ 411/372.5, 372.6, 373, 377
   See application file for complete search history.

(56) References Cited

U.S. PATENT DOCUMENTS

| | | | | | |
|---|---|---|---|---|---|
| 2,596,780 | A | * | 5/1952 | Meyers et al. | 267/140 |
| 2,899,703 | A | * | 8/1959 | Johnson | 16/86 A |
| 2,933,006 | A | * | 4/1960 | Gibb | 411/373 |
| 3,485,134 | A | * | 12/1969 | Ott | 411/372 |
| 3,885,492 | A | * | 5/1975 | Gutshall | 411/373 |
| 4,129,060 | A | * | 12/1978 | Gould | 411/372.5 |
| 4,944,644 | A | | 7/1990 | Bell | |
| 5,536,124 | A | * | 7/1996 | Silva | 411/85 |
| 5,941,567 | A | * | 8/1999 | Wickenheiser | 280/808 |
| 5,988,966 | A | * | 11/1999 | Chen et al. | 411/372 |
| 6,295,697 | B1 | * | 10/2001 | Simon | 16/86 R |
| 2005/0210721 | A1 | * | 9/2005 | Blackburn | 40/209 |

OTHER PUBLICATIONS

KBT-Products-Plastic bolt cover, http://www.kbt.be/EXEN/site/products-detail, 2 pgs.

* cited by examiner

*Primary Examiner* — Flemming Saether
(74) *Attorney, Agent, or Firm* — Marsh Fischmann & Breyfogle LLP; Jonathon A. Szumny; Kent A. Lembke (57) ABSTRACT

An elastomeric cap for concealing a fastener used to secure an object (e.g., an elastomeric object such as foam padding or the like) to a substrate (e.g., frame, wall, etc.). A head of a fastener may be inserted through an aperture in one wall of the cap and into an internal cavity of the cap. A shank of the fastener may be at least partially inserted into or through an aperture of the object (e.g., and the substrate). A tool (e.g., screwdriver, torque wrench, etc) may be inserted through an opposing aperture in an opposing second wall of the cap and used to manipulate the fastener head and thus the shank to secure the object to the substrate via clamping of the object between the fastener head and opposing second wall of the cap on one hand and the substrate on the other hand.

14 Claims, 6 Drawing Sheets

FIG.6

ELASTOMERIC CAP FOR SEAMLESSLY CONCEALING FASTENER USED TO SECURE OBJECT TO SUBSTRATE

BACKGROUND

1. Field of the Description

The present invention generally relates to fasteners used to secure objects to substrates and, more particularly, to systems for and manners of concealing such fasteners.

2. Relevant Background

Ethylene vinyl acetate (EVA) (e.g., the material used in Crocs™ shoes) has shown significant promise as a padding material in several applications due to its weather resistance, chemical resistance, tear resistance, and the like. However, the chemistry of EVA foam that provides such advantages on the other hand generally makes use of adhesives to attach EVA foam to substrates a difficult proposition (i.e., EVA foam generally does not accept adhesives very well).

In this regard, traditional fasteners (e.g., screws, other threaded members) are sometimes used to secure EVA foam pads to substrates (e.g., frames). For instance, a fastener may be inserted through aligned apertures in a foam pad and substrate and threaded into the substrate until a head of the fastener clamps and thus secures the pad against the substrate. Typically, it may be advantageous to cover or conceal the fasteners to limit undesired interaction (e.g., tampering) with the fasteners and maintain the impact properties of the foam (e.g., such as in seat padding applications). In one existing system, a fastener may be inserted through an aperture in the bottom of a bowl or cup-shaped cap before being inserted through aligned apertures in the foam pad and the substrate. After threading or otherwise tightening the fastener against the bottom of the cap (and thus the pad against the substrate), a "pop top" connected to the cap by a living hinge may be closed to cover the top of the cap and thus conceal the fastener. The pop top may subsequently be opened to provide access to the fastener. Other existing systems include plastic or metal caps designed to snap and/or be adhered over fastener heads, two-part decorative caps, and/or the like, all to conceal the fastener heads from view and limit (e.g., unintended) interaction therewith.

SUMMARY

Existing systems for concealing fasteners used to secure foam padding and/or other objects to substrates are deficient in a number of regards. In one regard, existing systems are often susceptible to tampering with (e.g., via guests or the like) due to their easy removal from the surface of the padding and fail to substantially seamlessly blend into the overall assembly. On the other hand, some existing systems may provide little to no access to the fastener (e.g., even for personnel) after installation of the cap over the fastener. In another regard, some existing systems are made of a material that is too rigid for softer and/or curved substrates. Still further, some existing systems are designed only for a single type of fastener and thus are not widely usable in a variety of different contexts.

Accordingly, disclosed herein is an elastomeric cap (e.g., and related systems, methods of use, and the like) that effectively conceals a fastener used to secure an object (e.g., foam pad, children's toy, and/or the like) to a substrate (e.g., frame). The disclosed cap substantially seamlessly blends into the object being secured to the substrate by the fastener to limit undesired interaction with the fastener (e.g., via guests or the like) but still allows for needed access to the fastener (e.g., via personnel, workers, etc.). More specifically, the disclosed cap securely mechanically fastens to the object through a clamping force applied to the cap by a head of the fastener passing through an aperture in the cap and a substrate into which a shank of the fastener is inserted for purposes of securing the object to the substrate. Advantageously, the need for special hardware or tools can be limited as the fastener itself may be used to secure the disclosed cap to the object. Furthermore, the bond between the cap and the object may be substantially unsusceptible to weather or chemical degradation as the cap need not necessarily be adhered to the object. Still further, the flexible nature of the disclosed cap allows the cap to conform to curved or non-planar surfaces of the object.

In one aspect, an apparatus (e.g., cap) for concealing a fastener used to secure an object to a substrate includes an elastomeric body having upper and lower walls, an internal cavity disposed between the upper and lower walls, an upper aperture (e.g., hole, slit, slot, etc.) disposed through the upper wall and leading into the cavity, and a lower aperture (e.g., hole, slit, slot, etc.) disposed through the lower wall and leading into the cavity. The upper and lower apertures are disposed along an axis (e.g., a central axis or the like) of the body.

In one arrangement, a head of a fastener (e.g., screw, bolt, etc.) may be inserted through the lower aperture and into the cavity of the apparatus such that a shank of the fastener extends through the lower aperture and out of the apparatus. For instance, the inner diameter of the lower aperture may be smaller than the outer diameter of the head such that insertion of the head through the lower aperture into the cavity requires at least a slight deformation of the lower wall of the elastomeric body to allow for insertion of the head through the lower aperture. In one variation, a washer (e.g., having an outer diameter greater than that of the fastener head) may be disposed on the shank of the fastener and also inserted through the lower aperture (e.g., or a slot that intersects the lower aperture) and into the internal cavity along with the fastener head.

The shank of the fastener may be inserted through an aperture in an object (e.g., cushion or the like) and through or at least into an aligned aperture in a substrate (e.g., frame, base, etc.). The end of any appropriate tool (screwdriver, hex key, etc.) may be inserted through the upper aperture so as to contact the fastener head within the internal cavity and then manipulated (e.g., twisted along a longitudinal axis of the end of the tool) so as to manipulate the shank of the fastener relative to the substrate and secure the object to the substrate (and thus the elastomeric body to the object). In one arrangement, the inner diameter of the upper aperture may be less than the outer diameter of the end of the tool such that insertion of the tool end through the upper aperture and into the cavity requires at least a slight deformation or stretching of the upper wall of the elastomeric body to allow for insertion of the tool end through the upper aperture. This arrangement advantageously limits undesired interaction (e.g., tampering) with the fastener that may otherwise serve to loosen the fastener (and thus the object and/or body) from the substrate.

In one arrangement, the outer surface of the fastener shank and the inner surface of the substrate aperture may be correspondingly threaded (and/or configured to be threadably engageable, such as in the case of a wooden substrate) to allow for securement of the object and body relative to the substrate. In another arrangement, a nut may be threaded onto the shank after the shank has been inserted through the substrate aperture. In either case, the head of the fastener (and/or the washer if included) may serve to secure or urge the lower wall of the body against an upper surface of the object so that the lower wall is clamped between the head and/or washer and the object as the head of the fastener is being manipulated by the tool (or as a nut is being threaded along the shank so as to pull the head and/or washer against the lower wall of the body). Furthermore, the object may be clamped between the lower wall of the body and the substrate. After the object has been secured to the substrate (and thus after the elastomeric body has been secured to the object), the tool may be removed from the upper aperture in the upper wall. In the event that the upper wall of the elastomeric body was deformed to allow for insertion of the tool end through the upper aperture, the inner diameter of the upper aperture may return to its smaller, non-deformed size after removal of the tool from the upper aperture.

Any of the embodiments, arrangements, or the like discussed herein may be used (either alone or in combination with other embodiments, arrangement, or the like) with any of the disclosed aspects. Merely introducing a feature in accordance with commonly accepted antecedent basis practice does not limit the corresponding feature to the singular. Any failure to use phrases such as "at least one" does not limit the corresponding feature to the singular. Use of the phrase "at least generally," "at least partially," "substantially" or the like in relation to a particular feature encompasses the corresponding characteristic and insubstantial variations thereof. Furthermore, a reference of a feature in conjunction with the phrase "in one embodiment" does not limit the use of the feature to a single embodiment.

In addition to the exemplary aspects and embodiments described above, further aspects and embodiments will become apparent by reference to the drawings and by study of the following descriptions.

DETAILED DESCRIPTION

Disclosed herein is an elastomeric cap (e.g., and related systems, methods of use, and the like) that effectively conceals a fastener used to secure an object (e.g., foam pad, children's toy, and/or the like) to a substrate (e.g., frame). The disclosed cap substantially seamlessly blends into the object being secured to the substrate by the fastener to limit undesired interaction with the fastener (e.g., via guests or the like) but still allow for needed access to the fastener (e.g., via personnel, workers, etc.). More specifically, the disclosed cap securely mechanically fastens to the object through a clamping force applied to the cap by a head of the fastener passing through an aperture in the cap and a substrate into which a shank of the fastener is inserted for purposes of securing an object to the substrate. Advantageously, the need for special hardware or tools can be limited as the fastener itself may be used to secure the disclosed cap to the object. Furthermore, the bond between the cap and the object may be substantially unsusceptible to weather or chemical degradation as the cap need not necessarily be adhered to the object. Still further, the flexible nature of the disclosed cap allows the cap to conform to curved or non-planar surfaces of the object.

Figure 1:
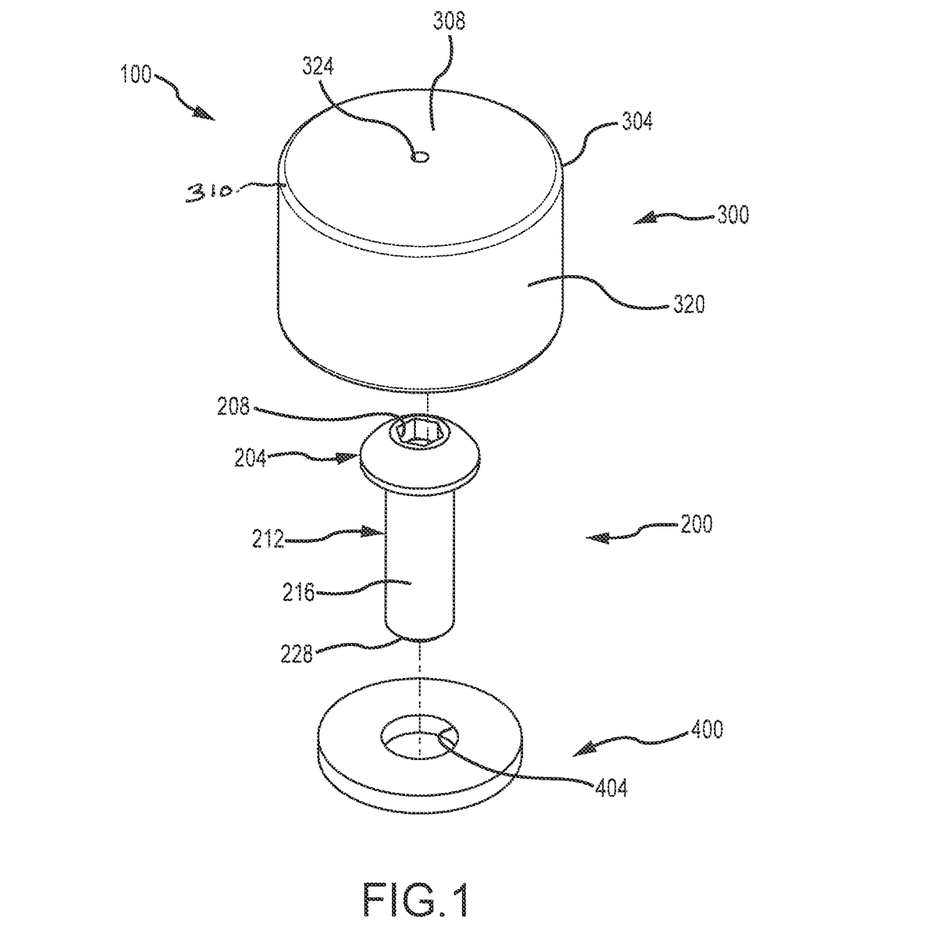
FIG. 1 is an exploded view of a system for securing an object to a substrate according to one embodiment.

FIG. 1 is an exploded view of a system (e.g., assembly) 100 according to one embodiment that generally includes at least one fastener 200 (e.g., screw, bolt, etc.) and a cap 300 (e.g., apparatus) for concealing the fastener 200, where the fastener 200 may be manipulated to substantially simultaneously secure an object (e.g., foam pad) to a substrate (e.g., seat frame) and secure the cap 300 to the object. The fastener 200 generally includes a head 204 having a tool-receiving aperture 208 therein and a shank 212 (e.g., shaft, post) connected (e.g., rigidly) to the head 204 and extending away from the head 204. The shank 212 includes an outer surface 216 that may be appropriately configured (e.g., threaded, textured, etc.) to allow the shank 212 to be secured relative to a substrate as will be discussed in more detail herein.

Figure 2:
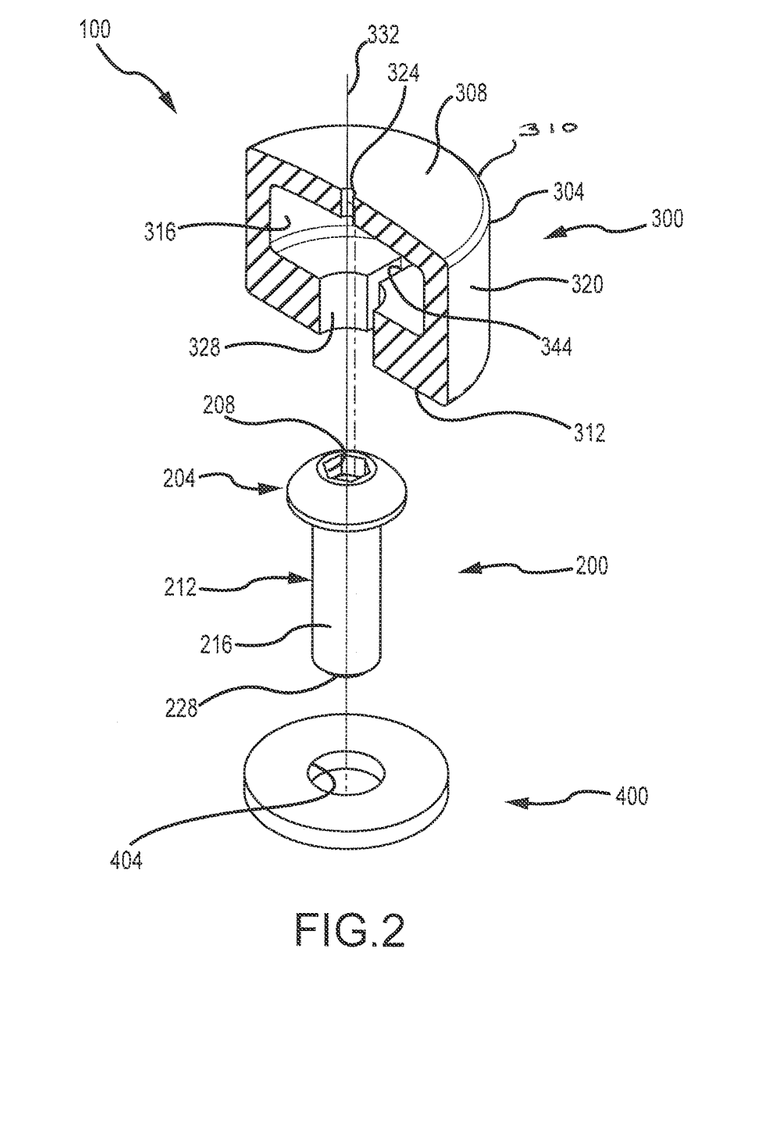
FIG. 2 is an exploded view similar to that shown in FIG. 1 but including a cutaway view of a cap of the system.
Figure 3:
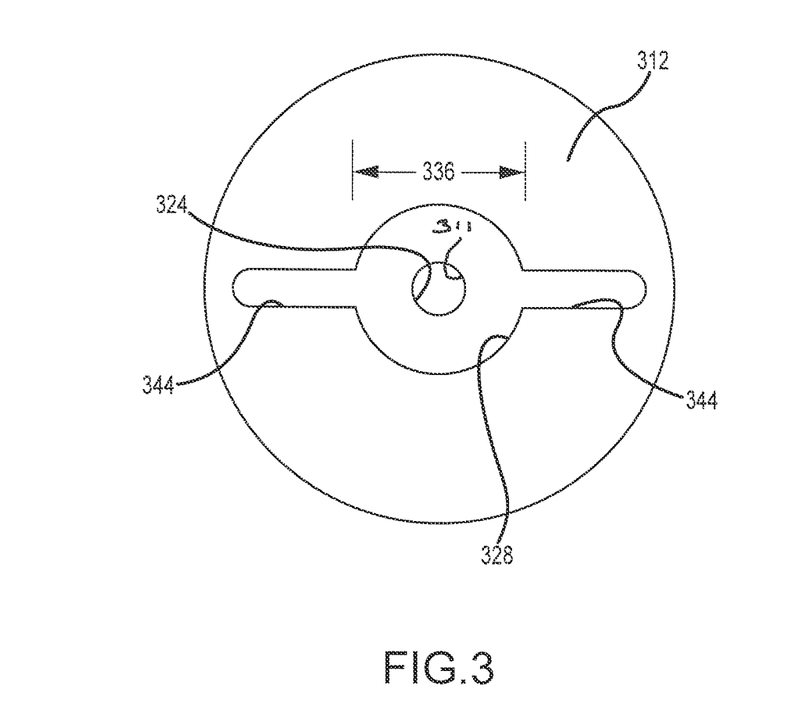
FIG. 3 is a bottom view of the cap of FIGS. 1 and 2.

With reference now to FIGS. 1-3, the cap 300 generally includes an at least partially hollow, elastomeric (e.g., flexible) body 304 that is broadly configured to flexibly conform to a non-planar (or planar) surface of an object being secured to a substrate, substantially seamlessly blend in with the object, elastically deform to allow for entry of a tool and a fastener into an internal cavity thereof, and the like. In one arrangement, the body 304 may be constructed of any appropriate elastomeric material that exhibits at least some range of elastomeric deformation such as EVA foam, silicone, and/or the like. In another arrangement, the materials of the body 304 may be chosen based on a particular hardness, elasticity, and/or the like. In one arrangement, the material of the body 304 may be selected based on the material used to manufacture the object to which the body is to be secured. For example, in the event that the object is seat padding constructed of EVA foam, the body 304 may also be constructed of EVA form to advantageously allow the body 304 to more seamlessly blend in with the object, maintain an overall durometer rating of the padding, and the like. In one embodiment, the body 304 may be a single piece of material.

Figure 4:
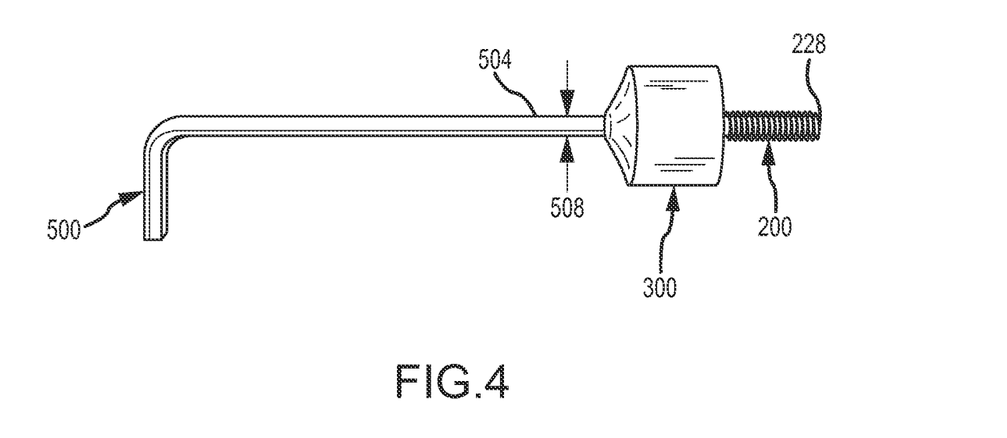
FIG. 4 is an assembled view of the system of FIGS. 1-3 and illustrating a tool being inserted into the cap to manipulate a fastener of the system.

The body 304 generally includes an upper or first wall 308 at least partially spaced from a lower or second wall 312 to form an internal cavity 316 therebetween that is sized to receive the head 204 of the fastener 200 therein. For instance, the internal cavity 316 may be sized such that an outer diameter 220 of the head 204 of the fastener 200 is at least half of an inner diameter (or maximum inner dimension) of the internal cavity 316. In one arrangement, the upper wall 308 may be spaced from and connected to the lower wall 312 by a sidewall 320 (as shown in FIGS. 1-2). In another arrangement, the upper wall 308 may be connected directly to the lower wall 312 about an outer periphery of each of the upper and lower walls 308, 312. In any case, at least one aperture 324 (e.g., opening, hole, slot, slit, etc.) may be disposed at least partially or fully through the upper wall 308 into the internal cavity 316 for receipt of a tool therethrough (e.g., tool 500 in FIG. 4, discussed more fully below). Furthermore, at least one aperture 328 (e.g., opening, hole, slot, slit, etc.) may be disposed at least partially or fully through the lower wall 312 into the internal cavity 316 for receipt of the head 204 and shank 212 of the fastener 200. In one arrangement, an inner diameter 348 of the upper aperture 324 may be less than an inner diameter of the lower aperture 336. The upper and lower apertures 324, 328 may be generally aligned along an axis 332 extending through the body 304 of the cap 300 (e.g., such as a central axis extending through a center of the upper and lower walls 308, 312). In one arrangement, the upper wall 308 may include an outer periphery 310, and an inner periphery 311 that surrounds the aperture 324. As shown, the upper wall 308 may be continuous between the inner and outer peripheries 310, 311 and be configured to remain continuous during insertion of the head 204 into the internal cavity 312 (e.g., via the aperture 328).

For instance, an inner diameter 336 (e.g., see FIG. 5) of the lower aperture 328 may, in a non-deformed or relaxed state of the lower wall 312, be less than an outer diameter 220 of the head 204 of the fastener 200. In this regard, insertion of the head 204 of the fastener 200 into the internal cavity 316 of the cap 300 via the lower aperture 328 may require elastic deformation of the lower wall 312 (e.g., via the head 204, another tool, etc.) to enlarge the inner diameter 336 to be at least substantially equal to the outer diameter 220. Once the head 204 has passed at least substantially completely into the internal cavity 316 of the cap 300, the elastically deformable nature of the body 304 may cause the lower wall 312 to at least substantially return to its non-deformed or relaxed shape whereby the inner diameter 336 of the lower aperture 328 is less than the outer diameter 220 of the head 204 of the fastener 200.

Figure 5:
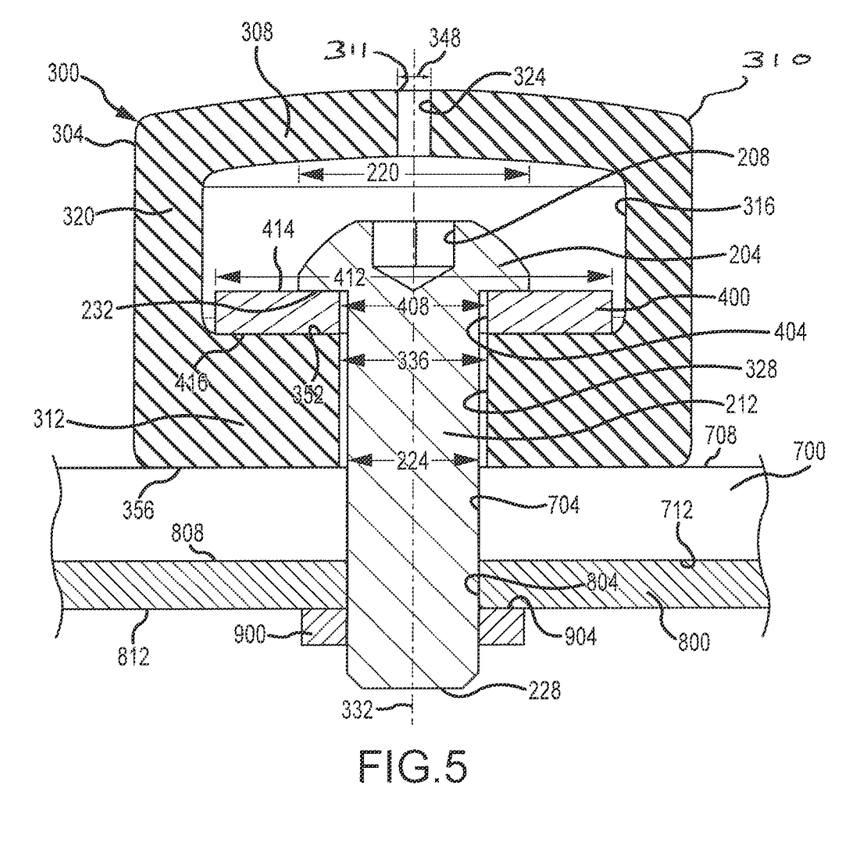
FIG. 5 is a cross-sectional assembled view of the system being used to secure an object to a substrate according to an embodiment.

At this point, the head 204 may be generally freely rotatable within the internal cavity 316 about axis 332 for use in securing the cap 300 and an object to a substrate (discussed in more detail below), but may be generally unable to be (or at least limited from being) removed from the internal cavity 316 via the lower aperture 328 along axis 332 due to the outer diameter 220 being greater than the inner diameter 336 (e.g., unless the lower wall 312 was forcibly deformed to enlarge the inner diameter 336). Furthermore, the shank 212 of the fastener 200 may extend fully through the lower aperture 328 and away from the body 304 of the cap 300. As shown in FIG. 5, the shank 212 may have an outer diameter 224 that is substantially equal to or less than the inner diameter 336 of the lower aperture 328 to allow for rotation of the fastener 200 about axis 332.

In one arrangement, the system 100 may further include a washer 400 disposable in the internal cavity 316 in any appropriate manner for use in enlarging the surface area of the lower wall 312 of the body 304 over which a clamping force of the head 204 may be exerted (e.g., such as at least 75% of an inner diameter of maximum inner dimension of the internal cavity 316). For instance, the shaft 212 of the fastener 200 may be inserted through an aperture 404 of the washer 400. After or substantially simultaneously with insertion of the head 204 through the lower aperture 328, the washer 400 may be inserted through the lower aperture 328. In one arrangement, the lower wall 312 may include a slit or slot 344 that intersects the lower aperture 328 and that facilitates insertion of the washer 400 through the lower wall 328 into the internal cavity 316 of the cap 300. See FIG. 3. As shown, an inner diameter 408 of the aperture 404 may be less than the outer diameter 220 of the head 204 while an outer diameter 412 of the washer 400 may be greater than the outer diameter 220 of the head 204.

In one arrangement, the slot 344 may have a length that is substantially equal to the outer diameter 412 of the washer 400 to facilitate passage of the washer 400 through the slot 344. In another arrangement, the length of the slot 344 may be some amount or degree less than the outer diameter 412 of the washer 400 (e.g., 25% less, etc.) to require deformation of the lower wall 312 to allow for passage of the washer 400 through the slot 344 and thereafter limit removal of the washer 400 from the internal cavity 316. In a further arrangement, a width of the slot 344 may be substantially equal to a thickness of the washer 400 to facilitate passage of the washer 400 through the slot 344. In yet another arrangement, the width of the slot 344 may be some amount or degree less than the outer diameter 412 of the washer 400 (e.g., 50% less, etc.) to require deformation of the lower wall 312 to allow for passage of the washer 400 through the slot 344 and thereafter limit removal of the washer 400 from the internal cavity 316.

To facilitate access (e.g., by personnel) to the head 204 of the fastener 200 by a tool 500 (e.g., see FIG. 5, discussed below) while limiting undesired interaction with the head 204 (e.g., by the fingers of guests or the like) and/or passage of the head 204 through the upper aperture 324, the inner diameter 348 of the upper aperture 324 may, in a non-deformed or relaxed state of the upper wall 308, be less than an outer diameter 508 of an end 504 of the tool 500 and less than the outer diameter 220 of the head 204 (e.g., less than an inner diameter (not labeled) of the tool-receiving aperture 208). More specifically, insertion of the end 504 of the tool 500 into the internal cavity 316 of the cap 300 via the upper aperture 328 (for manipulation of the head 204) may require elastic deformation of the upper wall 316 (e.g., via the end 504, another tool, etc.) to enlarge the inner diameter 348 to be at least substantially equal to the outer diameter 508. Once the end 504 of the tool 508 has been inserted through the upper aperture 324, the tool 500 can continue to be inserted along axis 332 until the end 504 has been received (e.g., seated) in the tool-receiving aperture 208 of the head 204.

While the end 504 is seated in the tool-receiving aperture 208, torquing or twisting of the tool 500 about axis 332 serves to induce corresponding rotation of the fastener 200 about the axis 332 for use in securing the cap 300 and an object to a substrate. Although the tool 500 and tool-receiving aperture 208 have been illustrated in the form of hexagonally-shaped components, numerous other tools and corresponding tool-receiving apertures are envisioned and encompassed herein (e.g., screwdrivers such as Phillips, Frearson, flat-head, etc.; wrenches such as Allen, Torx; and/or the like).

Figure 6:
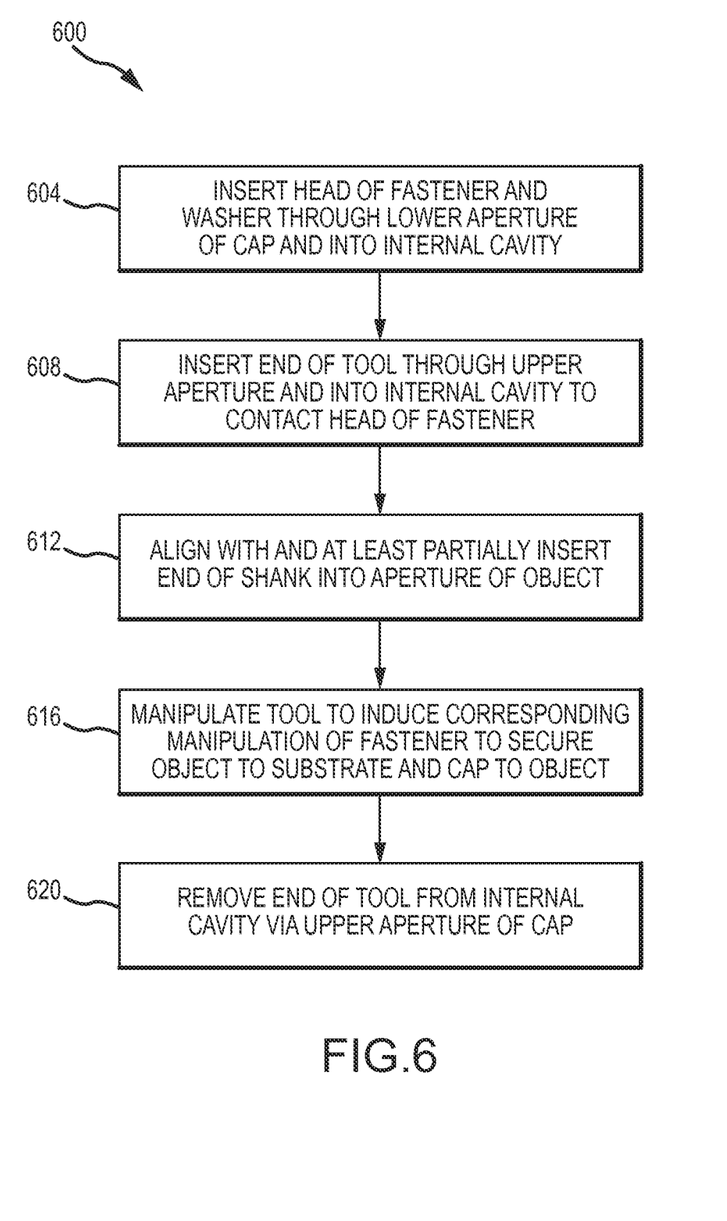
FIG. 6 is a flow diagram of a method of loading a fastener into the cap of FIGS. 1-3 and utilizing the resulting system to secure an object to a substrate.

To facilitate the reader's understanding of the functionality of the system 100, reference will now be additionally made to FIG. 6 which presents a flow diagram of a method 600 of loading the fastener 200 into the cap 300 and utilizing the system 100 to secure an object 700 (e.g., foam padding, plastic toy, etc.) to a substrate 800 (e.g., seat frame, etc.). See FIG. 5. It is to be understood, however, that use of the system 100 to secure the object 700 to the substrate does not necessitate loading of the fastener 200 into the cap 300 upon each use of the system 100. For instance, it is envisioned that the fastener 200 (e.g., and washer 400) may come pre-loaded into the cap 300 in which case an operator (e.g., worker, personnel) could proceed right to aligning the shank 212 of the fastener 200 with apertures through the object 700 and substrate 800 and inserting the tool 500 through the upper aperture 324 to manipulate the fastener 200. Furthermore, some of the steps may be performed in an order different than specifically described herein (e.g., the tool 500 may be inserted into the internal cavity 316 before or after the shank 212 is at least partially inserted into an aperture of the object 700).

In any event, the method 600 may include inserting 604 the head 204 of the fastener 200 (and the washer 400, if included) through the lower aperture 328 (and slot 344, if included) into the internal cavity 316 of the cap 300 (e.g., such that the tool-receiving aperture 208 and shank 212 are generally aligned with the axis 332 of the body 304 of the cap 300). See FIG. 5. Also, the method 600 may include inserting 308 the end 504 of the tool 500 through the upper aperture 324 (e.g., see FIG. 4) and into the internal cavity 316 to contact the head 204 of the fastener 200 and be seated in the tool-receiving aperture 208. As discussed previously, either or both of the inserting steps 604, 608 may include respectively deforming the lower and upper walls 312, 308 of the cap 300 to enlarge the lower and upper apertures 328, 324 to allow for insertion of the head 204 (and washer 400, if included) and the end 504 of the tool 500. An end 228 of the shank 212 may then be aligned 612 with and at least partially inserted into an aperture 704 extending partially or fully through the object 700. In one arrangement, the end 228 of the shank 212 may also be at least partially inserted through an aperture 804 extending partially or fully through the substrate 800.

The method 600 may then include manipulating 616 (e.g., twisting or torquing about axis 332, holding against twisting or torquing movement about axis 332, etc.) the tool 500 (e.g., about axis 332) to induce a corresponding manipulation of the fastener 200 for purposes of securing the object 700 to the substrate 800 and securing the cap 300 to the object 700. In one arrangement, the aperture 804 through the substrate 800 may be threaded. In another arrangement, the aperture 804 through the substrate 800 may be non-threaded to allow for substantially free insertion of the end 228 of the shank 212 therethrough, where a nut 900 may be threaded onto the end 228 of the shank 212 after the end 228 has passed fully through the aperture 804. In either case, manipulation of the tool 500 and/or of the nut 900 (e.g., twisting, holding against twisting movement, etc.) may cause a lower surface 232 of the head 204 (and/or a lower surface 416 of the washer 400 when the lower surface 232 of the nut 200 is forced against an upper surface 414 of the washer 400) and an upper surface 808 of the substrate 800 (or, if included, an upper surface 904 of nut 900 acting against a lower surface 812 of substrate 800) to forcibly clamp the lower wall 312 of the cap 300 and the object 700 therebetween. See FIG. 5. Stated differently, upper and lower surface 352, 356 of the lower wall 312 of the cap 300 may be respectively clamped between the lower surface 232 of the head 204 (or lower surface 416 of washer 400) and an upper surface 708 of the object 700. Furthermore, upper and lower surfaces 708, 712 of the object 700 may be respectively clamped between the lower surface 356 of lower wall 312 of the cap 300 and the upper surface 808 of the substrate 800.

After the manipulating step 616, the end 504 of the tool 500 may be removed 620 from the internal cavity 316 via the upper aperture 324 of the cap 300. In the event that the upper wall 308 was deformed to enlarge the upper aperture 324 to allow for insertion of the end 504 therethrough, the upper wall 308 may, via the inherent elasticity of the body 304, return to its original or non-deformed shape whereby the inner diameter 348 of the upper aperture 324 is less than the outer diameter 508 of the end 504 of the tool 500. Also in the non-deformed shape, the inner diameter 348 of the upper aperture 324 may be less than the outer diameter 229 of the head 204 of the fastener 200. At this point, the cap 300 effectively conceals 200 (e.g., hides the existence of) the fastener and substantially seamlessly blends into the object 700 to limit undesired interaction with the fastener 200 (e.g., via guests or the like) but still allow for needed access to the fastener (e.g., via personnel, workers, etc.). Furthermore, the bond or junction between the cap 300 and the object 700 (e.g., between lower surface 356 and upper surface 708, see FIG. 5) may be substantially unsusceptible to weather or chemical degradation as the cap 300 need not necessarily be adhered to the object 700. While not shown, the flexible nature of the cap 300 would allow the lower surface 356 of the cap 300 to conform to curved or non-planar upper surface 708 of the object 700.

It will be readily appreciated that many additions and/or deviations may be made from the specific embodiments disclosed in the specification without departing from the spirit and scope of the invention and that the illustrations and discussion herein has only been provided to assist the reader in understanding the various aspects of the present disclosure. In one arrangement, for instance, the fastener 200 may be a self-tapping screw usable in the case where one or both of apertures 704, 804 have not yet been formed before step 612 of the method 600. In another arrangement, the cap 300 may be configured for receipt of two or more fasteners 200 (e.g., via enlarging the cavity and adding additional pairs of upper and lower apertures 324, 328 along respective axes 332 through the body 304). In a further arrangement, one or more washers may be disposed on the shank 212 between the nut 900 (if included) and the lower surface 812 of the substrate 800. In yet another arrangement, an overall thickness of the body 304 between the upper and lower walls 308, 312 may gradually taper or otherwise decrease towards an outer periphery of the elastomeric body (e.g., near sidewall 320) to facilitate blending in of the cap 300 with the object 700. In another arrangement, the upper aperture 324 may be in the form of a slit (e.g., as opposed to a hole as shown in FIGS. 1-5), whereby the head 204 of the fastener 200 would not even be viewable through the slit. Furthermore, one or more various combinations of the above discussed arrangements and embodiments are also envisioned.

While this specification contains many specifics, these should not be construed as limitations on the scope of the disclosure or of what may be claimed, but rather as descriptions of features specific to particular embodiments of the disclosure. For instance, the various uses of "upper" and "lower" herein does not necessarily mean that the "upper" surface or the like necessarily faces in an upward direction. Rather, such terms have been used for purposes of distinguishing opposing features of the corresponding components. Furthermore, certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations may be depicted in the drawings in a particular order, this should not be understood as requiring that such operations be performed in the particular order shown or in sequential order, or that all illustrated operations be performed, to achieve desirable results. In certain circumstances, multitasking and/or parallel processing may be advantageous. Moreover, the separation of various system components in the embodiments described above should not be understood as requiring such separation in all embodiments, and it should be understood that the described program components and systems can generally be integrated together in a single software and/or hardware product or packaged into multiple software and/or hardware products.

The above described embodiments including the preferred embodiment and the best mode of the invention known to the inventor at the time of filing are given by illustrative examples only.

We claim:

1. An apparatus for concealing a fastener used to secure an object to a substrate, the apparatus comprising:

an elastomeric body comprising an upper wall, a lower wall, and an axis extending through the upper and lower walls;

a cavity disposed between the upper and lower walls;

an upper aperture disposed through the upper wall and leading into the cavity, wherein the upper aperture is disposed along the axis;

a lower aperture disposed through the lower wall and leading into the cavity, wherein the lower aperture is disposed along the axis; and a slot extending through the lower wall and leading into the cavity, wherein the slot intersects the lower aperture.

2. The apparatus of claim 1, wherein the axis comprises a central axis of the elastomeric body.

3. The apparatus of claim 2, wherein the central axis of the elastomeric body passes through a center of each of the upper and lower walls.

4. The apparatus of claim 1, wherein the elastomeric body further comprises a sidewall extending about a periphery of the elastomeric body and spacing the upper wall from the lower wall.

5. The apparatus of claim 1, wherein the elastomeric body consists of a single piece.

6. The apparatus of claim 1, wherein an overall thickness of the elastomeric body between the upper and lower walls decreases towards an outer periphery of the elastomeric cap.

7. The apparatus of claim 1, wherein the upper aperture has a first inner diameter, wherein the lower aperture has a second inner diameter, and wherein the first inner diameter is less than the second inner diameter.

8. A system, comprising:
an elastomeric cap comprising an upper wall, a lower wall, a cavity between the upper and lower walls, an upper aperture disposed through the upper wall and leading into the cavity, and a lower aperture disposed through the lower wall and leading into the cavity, wherein the elastomeric cap is a single piece of material;

a fastener comprising a head and a shank connected to the head and extending away from the head, wherein the head is disposed within the cavity, wherein an inner diameter of the upper aperture is less than an outer diameter of the head, wherein the shank extends through the lower aperture and away from the elastomeric body, wherein the shank comprises an outer diameter, wherein the outer diameter of the shank is substantially equal to or less than the inner diameter of the lower aperture; and a washer disposed within the cavity between the head and the lower wall, wherein the washer comprises an outer diameter, wherein the outer diameter of the washer is greater than the outer diameter of the head, wherein the upper wall includes an outer periphery, wherein the upper wall includes an inner periphery that surrounds the upper aperture, and wherein the upper wall is continuous between the inner and outer peripheries and is configured to remain continuous during insertion of the head into the cavity.

9. The system of claim 8, wherein the lower aperture comprises an inner diameter, and wherein the outer diameter of the head is greater than the inner diameter of the lower aperture.

10. The system of claim 8, wherein the upper aperture, the head and the lower aperture are disposed along a central axis of the elastomeric cap.

11. The system of claim 8, further comprising a nut disposable on the shank of the fastener.

12. The system of claim 8, wherein an overall thickness of the elastomeric cap between the upper and lower walls decreases towards an outer periphery of the elastomeric cap.

13. The system of claim 8, wherein the head is rotatable within the cavity relative to the elastomeric cap.

14. A system, comprising:
an elastomeric cap comprising an upper wall, a lower wall, a cavity between the upper and lower walls, and a lower aperture disposed through the lower wall and leading into the cavity;

a fastener comprising a head and a shank connected to the head and extending away from the head, wherein the head is disposed within the cavity, wherein the shank extends through the lower aperture and away from the elastomeric body, wherein the shank comprises an outer diameter, wherein the outer diameter of the shank is substantially equal to or less than the inner diameter of the lower aperture; and a washer disposed within the cavity between the head and the lower wall, wherein the washer comprises an outer diameter, and wherein the outer diameter of the washer is greater than the outer diameter of the head, wherein the elastomeric body further comprises a slot extending through the lower wall and intersecting the lower aperture, wherein the slot is substantially sized to receive the washer therethrough.

\* \* \* \* \*